US008875032B2

(12) United States Patent
Olsen et al.

(10) Patent No.: US 8,875,032 B2
(45) Date of Patent: Oct. 28, 2014

(54) SYSTEM AND METHOD FOR DYNAMIC CONFIGURATION OF COMPONENTS OF WEB INTERFACES

(75) Inventors: Ronald D. Olsen, Lake View, NY (US); Brian Kamrowski, Amherst, NY (US)

(73) Assignee: Dialogic Corporation, Quebec (CA)

( * ) Notice: Subject to any disclaimer, the term of this patent is extended or adjusted under 35 U.S.C. 154(b) by 582 days.

(21) Appl. No.: 12/437,213

(22) Filed: May 7, 2009

(65) Prior Publication Data
US 2009/0282349 A1 Nov. 12, 2009

Related U.S. Application Data

(60) Provisional application No. 61/126,901, filed on May 8, 2008.

(51) Int. Cl.
*G06F 3/01* (2006.01)
*G06F 17/21* (2006.01)
*G06F 17/22* (2006.01)
*G06F 17/30* (2006.01)
*G06F 17/24* (2006.01)
*G06F 9/445* (2006.01)
*G06F 9/44* (2006.01)
*G06F 3/00* (2006.01)

(52) U.S. Cl.
CPC .......... *G06F 17/2247* (2013.01); *G06F 17/211* (2013.01); *G06F 17/30896* (2013.01); *G06F 17/245* (2013.01); *G06F 9/44505* (2013.01); *G06F 9/4443* (2013.01)
USPC ............ 715/760; 715/825; 715/742; 715/765

(58) Field of Classification Search
USPC ......................................... 715/760, 742, 825
See application file for complete search history.

(56) References Cited

U.S. PATENT DOCUMENTS

| 6,035,330 | A  | * | 3/2000  | Astiz et al.     | 709/218 |
| 7,278,098 | B1 | * | 10/2007 | Boye et al.      | 715/210 |
| 2002/0105548 | A1 | * | 8/2002  | Hayton et al.    | 345/764 |
| 2003/0167315 | A1 | * | 9/2003  | Chowdhry et al.  | 709/218 |
| 2004/0004629 | A1 | * | 1/2004  | Hamilton et al.  | 345/700 |
| 2004/0098467 | A1 | * | 5/2004  | Dewey et al.     | 709/219 |
| 2004/0183831 | A1 | * | 9/2004  | Ritchy et al.    | 345/762 |
| 2004/0230947 | A1 | * | 11/2004 | Bales et al.     | 717/110 |
| 2006/0015817 | A1 | * | 1/2006  | Fioretti et al.  | 715/765 |
| 2006/0036954 | A1 | * | 2/2006  | Satyadas et al.  | 715/742 |

(Continued)

OTHER PUBLICATIONS

MFC Library Reference. "CListCtrl Class". http://msdn.microsoft.com/en-US/library/21tcxyOk(VS.80).aspx, 2009.

*Primary Examiner* — Amy Ng
*Assistant Examiner* — Toan Vu
(74) *Attorney, Agent, or Firm* — Chapin IP Law, LLC

(57) ABSTRACT

An object is implemented to represent a visual element in a user interface while being linked to data associated with the visual element. A user can manipulate the visual element through the user interface to modify the object or how the object is processed. The data associated with the visual element tracks with the modifications to the visual element and/or object to permit the data to conceptually move with the visual element. The object may be implemented using a document object model in a web browser. The object may be assigned to a user interface component that may treat the object differently in dependence upon the user manipulations. The visual element may be formed using HTML and the user manipulations may be implemented using a script.

22 Claims, 6 Drawing Sheets

(56) References Cited

U.S. PATENT DOCUMENTS

| | | | |
|---|---|---|---|
| 2006/0090138 A1* | 4/2006 | Wang et al. | 715/760 |
| 2006/0212806 A1* | 9/2006 | Griffin et al. | 715/523 |
| 2007/0118793 A1* | 5/2007 | Arora et al. | 715/501.1 |
| 2007/0226613 A1* | 9/2007 | Tandriono et al. | 715/530 |
| 2007/0226633 A1* | 9/2007 | Lyle et al. | 715/742 |
| 2007/0233377 A1* | 10/2007 | Salay et al. | 701/211 |
| 2007/0265930 A1* | 11/2007 | Mohr | 705/26 |
| 2007/0271089 A1* | 11/2007 | Bates et al. | 704/9 |
| 2008/0046825 A1* | 2/2008 | Bedi et al. | 715/742 |
| 2008/0313648 A1* | 12/2008 | Wang et al. | 719/315 |
| 2009/0249300 A1* | 10/2009 | Vainer et al. | 717/127 |
| 2011/0314396 A1* | 12/2011 | Diab et al. | 715/760 |

\* cited by examiner

```
                    Table Heading
                    ─────────────
                       Row 1
                       1010
        ┌─────────┐ ┌─────────┐ ┌─────────┐
        │Cfg Item 1│ │Cfg Item 2│ │Cfg Item 3│   704
        └─────────┘ └─────────┘ └─────────┘
                       Row 3
                       1012
                       Row 4
                       1013
```
Fig. 10
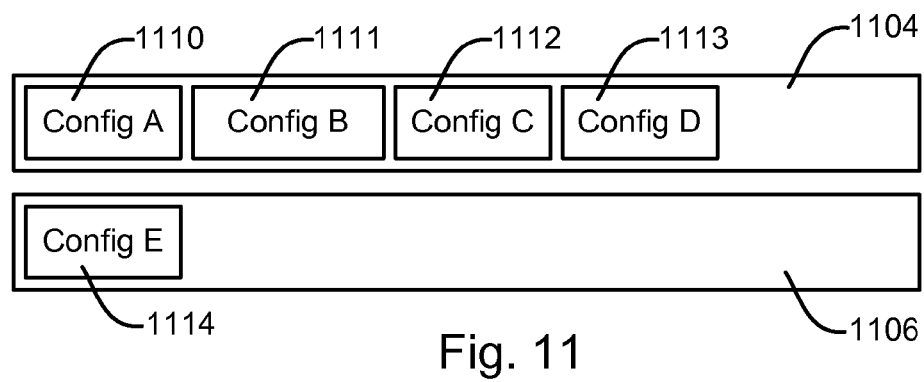
Fig. 11
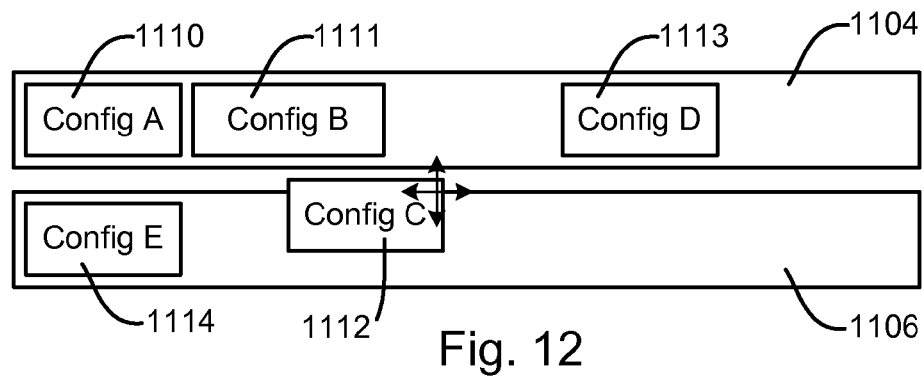
Fig. 12

SYSTEM AND METHOD FOR DYNAMIC CONFIGURATION OF COMPONENTS OF WEB INTERFACES

CROSS REFERENCE TO RELATED APPLICATIONS

This application claims the benefit of U.S. Provisional Application No. 61/126,901, filed May 8, 2008, the entire disclosure of which is hereby incorporated herein by reference.

STATEMENT REGARDING FEDERALLY SPONSORED RESEARCH OR DEVELOPMENT

N/A

BACKGROUND OF THE INVENTION

The presently disclosed system and method relate generally to configuring a user interface, and more particularly to dynamically configuring elements within a user interface based on user input.

A user interface (UI) is often provided for a user to interact with a device or information concerning the device, the information and/or device hereinafter being referred to as a product. The product and the UI typically interact over a connection, which can be in the form of a direct connection or a network connection, for example. A network connection is often used to provide remote access to the product for the user. The UI typically permits the user to access the product to supply input and receive output. Examples of input mechanisms include a keyboard, a mouse, a display, as well as other devices that permit a user to provide input to a machine. Examples of mechanisms that permit the user to receive information include displays, panels with visual indicators, audio and tactile output devices, and any other type of device that permits a user to receive information from a machine. A UI is often useful to permit a user to configure the product or receive information about the product, in relation to product maintenance, upgrades, configuration, status or operating parameters, for example.

In computer-based systems, a UI is frequently implemented with a client computer (PC) that has a display with a keyboard and a mouse to permit a user to interact with various virtual or physical devices or information. The PC typically has a processor, memory and a network connection for implementing the UI over a network. Generally, the PC can implement the UI using a web browser that can provide access to information concerning a remote product. For example, a UI may present various selectable settings that a user can manipulate with input to the UI. The selectable settings presented to the user are typically configured through an application that renders various types of formatted interface components in the UI. The term "interface components" refers to elements that may be in a display that are often visually available to a user. The sub-elements of an element of a UI are also encompassed within the term "interface components." Typically, the interface components form only a part of the UI with which the user interacts. A user may interact with the UI, for example, by providing input to an interface component, as well as receiving output from an interface component.

The user may sometimes manipulate some aspects of the interface components to obtain or provide information, for example in conjunction with the product to which the UI is coupled. In the instances where the UI includes a display device, the application responsible for configuring the UI may render and present interface components such as graphical push buttons, check boxes, radio buttons, text boxes, drop-down boxes, tables, menus, links, and other items that may be familiar to a user for making selections, retrieving data or entering information through the UI. Sub-elements of these types of interface components may include table cells, columns, rows, entries in lists, such as components of a drop down box list, and other items that may be associated with an interface component.

An example of a conventional UI and product arrangement involves a client-server network topology, where the client system hosts the UI and the server interacts with the product to facilitate information exchanged between the UI and the product. In such an arrangement, the UI can be provided as a web browser, for example, that communicates with the server using a hypertext transfer protocol (HTTP) over a TCP/IP (transmission control protocol/internet protocol) controlled communication link. The product may be provided as a device, such as a telecommunication gateway, or a service, such as an application running on a server, for example. Typically, the web browser, either through user interaction or through web browser configuration, sends a request to the server to cause a product-related web page to be loaded into the web browser from the server. In response, the server provides a requested web page that may contain HTML (hypertext markup language), XML (extensible markup language) and/or scripting code such as JavaScript. The HTML, XML and/or scripting code operate(s) in the web browser to render the UI with information related to the product. The rendered UI may also permit a user to interact through the UI to modify or configure the product.

Conventionally, the UI is provided in a static configuration, meaning that the UI is constructed with interface components that do not move or have characteristics that do not change. For example, the graphical push buttons, check boxes, radio buttons, text boxes, drop-down boxes, tables, menus and links mentioned above are interface components that are configured based on configuration data provided from the server in a downloaded document, such as an HTML document. The characteristics of the interface components, such as location, color, order of operations, functionality, types of inputs and outputs, as well as other aspects of the interface components, generally do not change once rendered in the UI.

For example, a table provided as an interface component may provide a listing of rules that are processed in a particular order, based on their arrangement within the table. The table is generally static in nature, so that changes made to the table can be somewhat complex in nature. The user may wish, for example, to reorder the rules represented in different rows of the table. The table rows may have varying amounts of data, and may have different data for a similar rule type in different rows. In addition, the table may have columns, the entries for which may be empty for a given row representing a rule. Some of the operations a user may wish to conduct on the table include adding a row, removing a row, reordering rows, and adding, removing or manipulating criteria within different columns of a given row or set of rows.

Referring to FIG. 1, a block diagram of a conceptual structure 100 for composing a conventional UI is illustrated. Structure 100 is an organization of components that may be used to implement a UI through a display 110, which may be responsive to a user input 112. Display 110 provides a visual element 114 that acts as an interface component. The appearance and operation of visual element 114 is governed by an instance of an object 116 located in browser memory 118. Object 116 may accept user input 112 that can influence visual element 114. Object 116 also provides structured data and methods for defining the operation of visual element 114. The data associated with visual element 114 may be provided from a data store 122. The data stored in data store 122 may be structured in an object form to simplify interaction between object 116 and the data in data store 122. The data in data store 122 is mapped to object 116 using a data object index 120. The data associated with visual element 114 may be manipulated by the user with user input 112, which may change the mapping between data store 122 and object 116, as provided by data object index 120. For example, the user may make modifications to the UI by relocating visual element 114. In such an instance, especially where multiple visual elements are moved in display 110, the mapping between object 116 and data object index 120 can become highly complex. The complexity can be particularly increased when parts or all of visual element 114 are deleted. The deletion of part or all of visual element 114 creates gaps or "holes" in data store 122, which makes memory management challenging. The challenge and complexity of memory management can become particularly difficult with a relatively large number of changes such as deletions and/or additions.

Accordingly, with conventional UIs that are static in nature, modifications through the interface components can be complex, difficult and unwieldy. Data associated with an interface component, such as visual element 114, is stored in an object or cache associated with the UI. In an instance where the UI is implemented with a web browser, data associated with an interface component can be stored in an object maintained by script code. The data is mapped to the object using data object index 120. The data may be presented on display 110 through visual element 114 and manipulated by the user (not shown). If a change to the configuration of the UI is desired, the user manipulates visual element 114 as an interface component, such as by moving the interface component to a different location within the browser display. As such changes are made, values to reflect the visual state of the interface component are changed within the object 116 that stores the data for the interface component. An example of a complex manipulation of an interface component is manipulating rows of a table, such as by swapping rows within the table. Such an action is especially complex if each row has a different number of columns or entries. The columns or entries associated with rows in the table can be HTML cells, for example. The manipulation of table rows causes the mapping between data object index 120 and the visual location to become highly complex. The complexity of the mapping between data object index 120 and the visual location is particularly increased when table rows are moved or deleted.

Another drawback to providing an interface component, such as the above-described table that can be manipulated by a user, is that the use of the object does not comply with accepted rules for object-oriented programming related to encapsulation, for example. The concept of encapsulation in relation to object-oriented programming provides for concealment of the functional details of a class from objects related to the class. Encapsulation can enhance an application developed using object-oriented programming by preventing uncertain or abstracted implementations of functions through the use of a well-defined interface with an object. Object-oriented design and programming provides a number of advantages in software management and reduced design complexity, and is generally a preferred software development technique. When manipulation of an interface component is permitted in a web browser, as discussed above, the advantages of the object-oriented paradigm can be lost through lack of encapsulation and increased complexity of the mapping between the data object index and the visual location of interface components.

Referring to FIG. 2, a block diagram shows a software component structure 200 for implementing a customized UI with components that can be manipulated by a user (not shown). A visual element 214 represents data and operations defined by a data store 222. The user interacts with a display 210, upon which visual element 214 is presented, and may provide user input 212 to manipulate the data or operations associated with visual element 214. A data reference 216 coordinates a mapping between data and data store 222 and visual element 214 in keeping with user input 212. Structure 200 can help to reduce some of the complexity associated with mapping data with relocatable visual element 214. The challenge of tracking data associated with visual element 214 following changes in visual representation is met by providing reference 216 associated with visual element 214. Reference 216 serves as map to associate visual element 214 with other forms of data, such as a database key or pointer to additional data. However, provision of an additional reference value is typically specific to particular customized object-oriented applications, and not necessarily generalized web interfaces. In addition, the provision of reference 216 can provide additional complexity for a UI, rather than simplifying relationships.

BRIEF SUMMARY OF THE INVENTION

The disclosed system and method simplifies a link between visual characteristics and data associated with an interface component. Visual characteristics are tied to interface components within the document object model (DOM). The DOM provides encapsulation for the details of an object without exposing the implementation details as a public entity. The visual characteristics of the interface component may be manipulated in a display, and data associated with the visual characteristics is associated with the interface component directly. The interface component can be a child component of a base component provided in a document, for example.

The user interface (UI) provided in accordance with the disclosed system and method permits a user to manipulate interface components, such as by repositioning them to change a precedence or sequence of operation. By manipulating the interface object, the data associated with the interface component is treated differently based on the visual manipulation. The interface component may be any type of visual element presented to a user, and is formed as an object instance. A custom attribute of the interface component is configured to maintain an association with object data assigned to the interface component. Accordingly, modification to the interface component, such as by relocating the interface component to change how the interface component is treated or processed, also includes data associated with the interface component. Visual modification to the interface component therefore conceptually modifies the visual location of the data associated with the interface component.

BRIEF DESCRIPTION OF THE SEVERAL VIEWS OF THE DRAWINGS

The disclosed system and method are described in greater detail below, with reference to the accompanying drawings, in which:

FIG. 10 is a diagram of a movable layer for an interface component in a new visual location in relation to the interface component illustrated in FIG. 4;

FIG. 11 is a diagram of a movable layer for an interface component having movable constituent elements;

FIG. 12 is a diagram of a movable layer for an interface component with a constituent element being movable among portions of an interface component, such as another movable layer;

DETAILED DESCRIPTION OF THE PREFERRED EMBODIMENTS

This application claims the benefit of U.S. Provisional Application No. 61/126,901, filed May 8, 2008, the entire disclosure of which is hereby incorporated herein by reference.

According to an exemplary embodiment of the disclosed system and method, configuration data is tied to interface components, such as HTML elements, within the document object model (DOM). The DOM is an object-oriented model that permits encapsulation of the details of an object without exposing the implementation details as a public entity. As interface components or elements are manipulated around a display, associated data moves with the interface component or element. The data is encapsulated in the interface component or element itself rather than via a reference. The data of an interface component is directly linked to the visual elements of the interface component. That is, the interface component need not represent a link to an object or object data, but rather may contain the data describing attributes of the interface component. The interface component or element itself can be a child element of a base element on the page.

Figure 1:
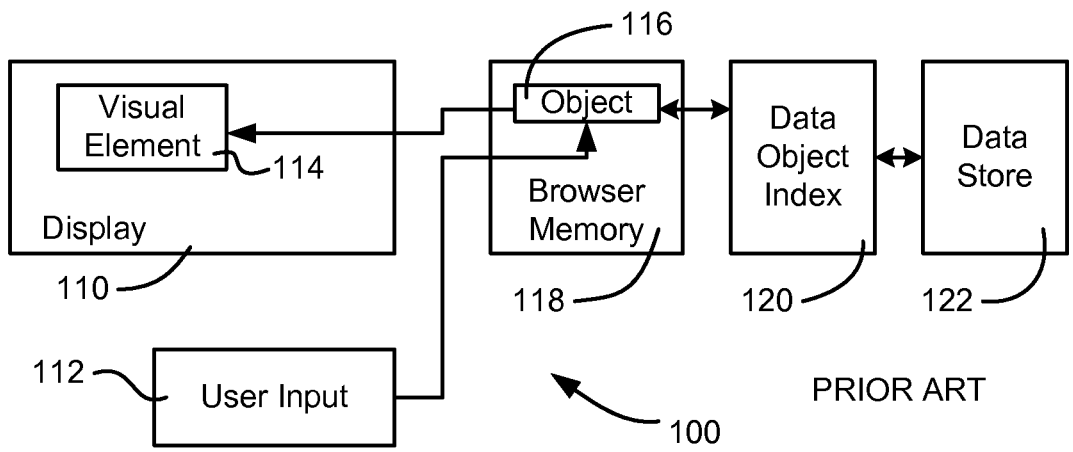
FIG. 1 is a block diagram showing conceptual structural organization of a conventional user interface.
Figure 2:
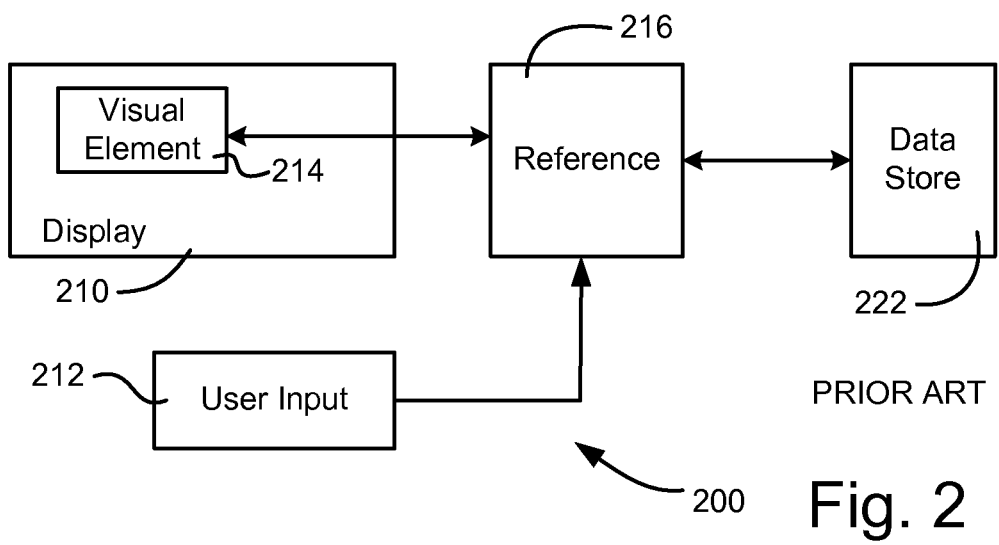
FIG. 2 is a block diagram showing conceptual structural organization of a conventional user interface.
Figure 3:
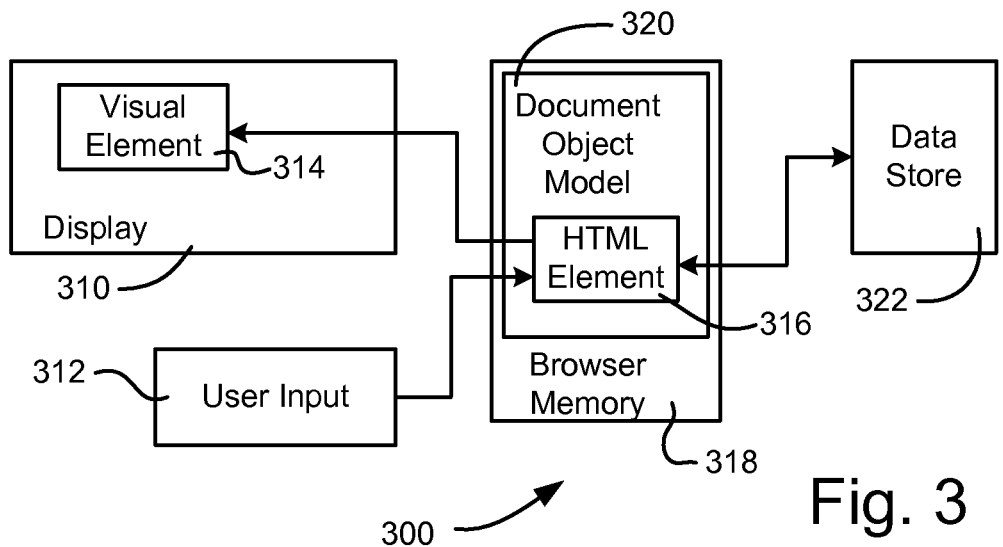
FIG. 3 is a block diagram showing conceptual structural organization of a user interface in accordance with an exemplary embodiment.

Referring to FIG. 3, a user interface is illustrated as represented by a software component structure 300. Structure 300 includes a display 310 for presenting an image to a user (not shown), including a visual element 314. The user can provide input through user input 312, which can be implemented using any type of ordinary input device, including a keyboard or a mouse. Visual element 314 represents an interface component as viewable by the user. Data related to both the appearance and the functionality of visual element 314 is provided by an HTML element 316 that is formed within a document object model (DOM) 320 in browser memory 318. HTML element 316 has an object structure and takes advantage of object properties, including inheritance and encapsulation. As visual element 314 is relocated in display 310, HTML element 316 is updated with position information.

In addition, HTML element 316 has a custom attribute that is linked to a data store 322. The data in data store 322 is used by HTML element 316 to indicate visual characteristics of visual element 314, as well as to indicate processing or operational properties associated with visual element 314 and HTML element 316. As visual element 314 is moved around display 310, the associated processing properties can change. For example, HTML element 316 can be an instance of an object that is a child of another HTML element (not shown), having related properties through inheritance. As visual element 314 is relocated on a parent visual element (not shown), changes can occur to the way in which the data in HTML 316 is processed. The data to be processed is taken from data store 322, for example, so that as visual element 314 is relocated, the data from data store 322 associated with visual element 314 and HTML element 316 conceptually moves with visual element 314.

Visual element 314 may also be altered with other activities that may occur with structure 300. For example, visual element 314 may be modified by asynchronous updates (not shown) to data store 322 that cause DOM 320 to be altered and visual element 314 to be re-rendered. As another example, a periodic function such as a timer (not shown) may be used to influence DOM 320 and HTML element 316. The timer may be used to cause updates to DOM 320 to make visual element 314 appear to be in motion, such as in the case of a marquee.

Figure 4:
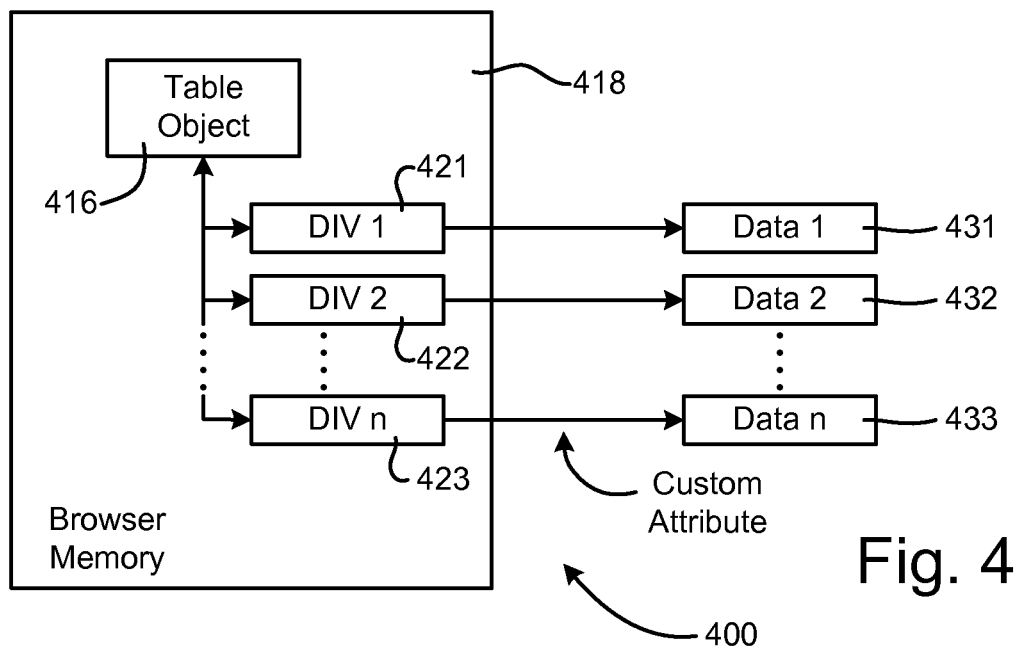
FIG. 4 is a block diagram showing a conceptual construct of an exemplary embodiment.

Referring now to FIG. 4, a block diagram of object-data relationship structure 400 is illustrated. A browser memory 418 hosts a number of object constructs, including a table object 416 and several DIV layers 421-423. DIV layers 421-423 are illustrated as being number 1-$n$ to show that an arbitrary number of child objects can be related to a parent object such as table object 416, through inheritance. Each of DIV layers 421-423 has custom attributes that are used to provide a link to associated data. For example, DIV layers 421-423 are associated with data elements 431-433, respectively, through the custom attributes of each of DIV layers 421-423.

As the relationship of DIV layers 421-423 changes through user input, such as by relocating a visual element associated with a respective DIV layer 421-423, the associated data follows the change in relationship through the link provided by the custom attribute.

Figure 5:
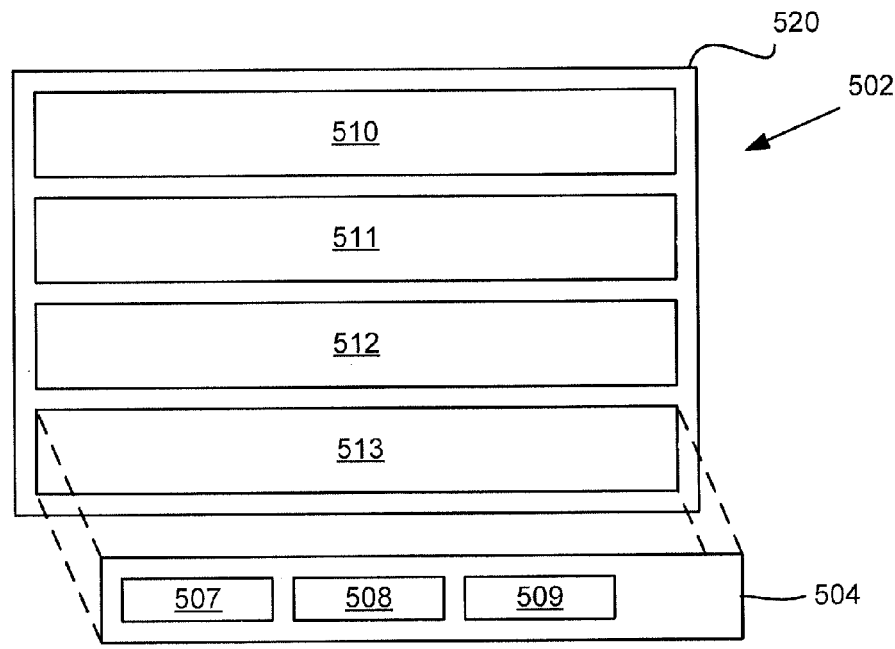
FIG. 5 is a diagram of a table as an interface component having user manipulated rows.

Referring to FIG. 5, an example of a basic HTML element is illustrated as a table 502. Table 502 may be implemented, for example, as visual element 314 in connection with HTML element 316 (FIG. 3). For example, table 502 can be implemented in accordance with table object 416 (FIG. 4), as described above. Additional child elements of Table 502, described below, can similarly be implemented as visual element 314 in connection with HTML element 316 (FIG. 3). It is understood that table 502 represents an exemplary HTML element as described and depicted herein, and that any other type of HTML element can be used in accordance with the disclosed system and method.

Table 502, as illustrated, has four row elements 510, 511, 512 and 513 (i.e., 510-513), arranged as cells in one column. Row elements 510-513 can be used as placeholder portions of a table template 520. Table template 520 forms a base element of table 502, and can be used for placement of visually moveable elements within table 502.

A "DIV" layer 504 is illustrated as being located over or visually associated with row element 513 of table template 520. DIV layer 504 is another HTML element that is provided as a child element of table template 520. Accordingly, DIV layer 504 can take advantage of object-oriented properties in relation to table template 520. The DIV layer refers to an HTML document division or section, such as may be defined in HTML with the <div> tag.

DIV layer 504, as illustrated, includes HTML sub-elements arranged as inner table cells 507, 508 and 509 (i.e., 507-509). Cells 507-509 are arranged as an inner-table located over and visually associated with DIV layer 504. Cells 507-509 can be formed as child elements of DIV layer 504 to take advantage of object-oriented concepts. Cells 507-509 are arranged adjacent to each other to form a column configuration over DIV layer 504. Accordingly, DIV layer 504 and cells 507-509 form an interface component with one row and three columns that are defined or driven by the constituent data. DIV layer 504 and cells 507-509 may be used to represent any type of information that might be presented to a user.

The display order of row elements 510-513 in table template 520 may have a certain assigned attribute or meaning. For example, the order may imply that top-most row element 510 is considered "first" and the bottom-most row element 513 is considered last. Thus, items associated with any of row elements 510-513, such as DIV layer 504 associated with row element 513, may be processed in an order based on the location of an associated row element 510-513 in table template 520. The order of processing need not be top-down, and can be provided according to any desired configuration for table template 520 and row elements 510-513. By way of a non-limiting example, the ordering may be left to right, color coded, numeric coded or any other ordered design. In accordance with the present disclosure, DIV layer 504 may be visually manipulated by the user to change an ordering of data or processing indicated via table 502.

The usage of a <div> tag as an HTML element to form a DIV layer 504 is not required, as there are many other types of elements in HTML and scripting that are known to one of ordinary skill in the art and that can be used to encapsulate data. The data is encapsulated into an abstract object that can be manipulated by a user. For example, any HTML element, such as "span," may be used to encapsulate data since HTML and its implementation in a web browser uses object-oriented design. The encapsulated data is associated with a respective interface component, so that data related to dynamic ordering, for example, can be maintained by the interface component itself. Scripting operations may be provided using XML (extensible markup language) in conjunction with JavaScript that executes in a web browser. An application programmer can use the DOM to render an HTML document in conjunction with JavaScript scripts that can be used to inspect or modify a web page dynamically.

The data saved by or with the interface component may include, for example, an order or preference indicated by visual attributes of the interface components. The data associated with the interface components that refers to visual attributes can be in addition to the data contained in the object of the interface components themselves, such as object attributes and object methods. By manipulating the DIV layer element and associated visual attributes, such as the hierarchical position of the interface component on the page, the drawbacks of conventional UIs can be overcome. In addition, the use of the DOM for interface components in a UI simplifies the dynamic configuration of a UI.

Interface components and their constituent elements can have data assigned to them. In the example of table 502, DIV layer 504 is an HTML element that is created as a child element and assigned to row element 513. DIV layer 504 can be movable within table template 520 to be assigned to another row element 510-512, for example. Custom attributes can be assigned to DIV layer 504. Data objects can be created and assigned to DIV layer 504 using the custom attribute feature. A created data object can contain all of the configuration information for row element 513 of table template 520, for example. Each data object may represent, for example, an inner table, sub-element or a row element of table 502. According to one exemplary embodiment, table 502 may be implemented to have zero or more rows, to which various HTML elements may be assigned, such as DIV layer 504. According to one exemplary embodiment, each of row elements 510-513 of table template 520 contains a configuration rule, with the order of row elements 510-513 that contain a rule indicating an order of processing for the rules.

Since in this exemplary embodiment DIV layer 504 is an immediate element located as a child element assigned to row element 513, table template 520 has access to the contents of DIV layer 504 via inheritance. The configuration and contents of the visual portions of the DIV element can be determined by the data associated with the DIV element. Because the constituent data of the DIV element is directly associated with and defines attributes of the visual portions, it is possible to dynamically construct the visual portions based on the constituent data. This feature of the disclosed system and method is advantageous with the object-oriented configuration of the interface components. For example, the DIV elements may take advantage of inheritance as an object-oriented feature that is employed in the disclosed system and method. The use of availability and use of object-oriented features differs from conventional approaches, which are not generally object-oriented and generally cannot take advantage of inheritance. With the feature of inheritance, any element created on DIV layer 504 can appear within row element 513 of table template 520. The data in the custom attributes that are assigned to DIV layer 504 is used to generate the visual elements in table 502.

Figure 6:
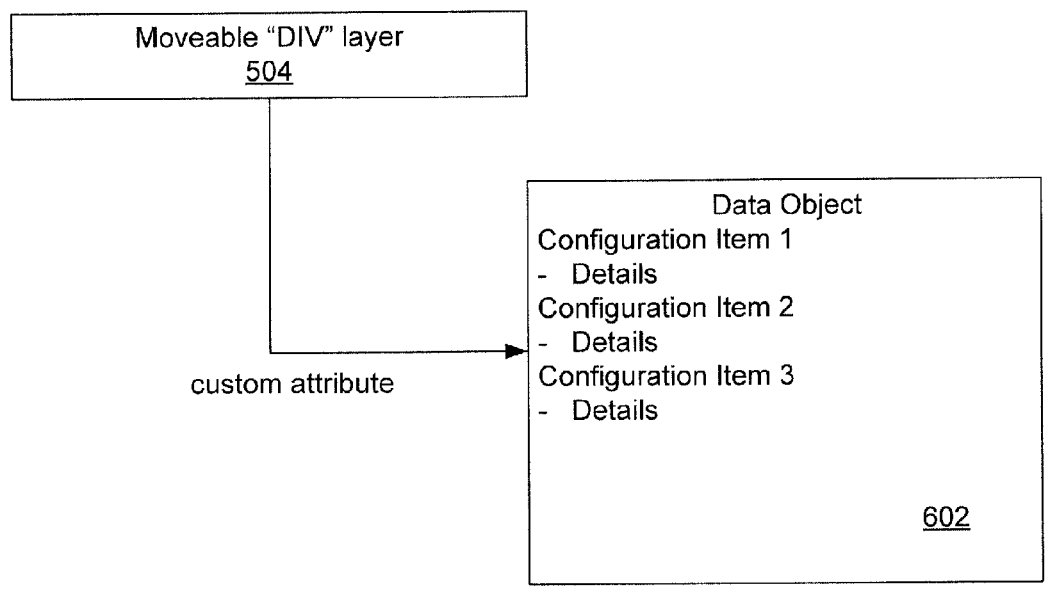
FIG. 6 is a diagram of a movable layer for an interface component.

Referring to FIG. 6, a data object 602 is assigned to DIV layer 504 using custom attributes. Data object 602 has three configuration elements assigned. These three configuration elements can be dynamically built into table 502, and assigned to DIV layer 504 as visual elements, as shown in FIG. 6. There are several well-known techniques that can be used to dynamically create interface components as UI elements, including the use of scripting in a web browser, for example. Other techniques for forming or manipulating a dynamic UI element include processing with active documents, applications that can run in a client or server environment and other form based programs, including programs created using visual object-oriented program languages or environments.

Figure 7:
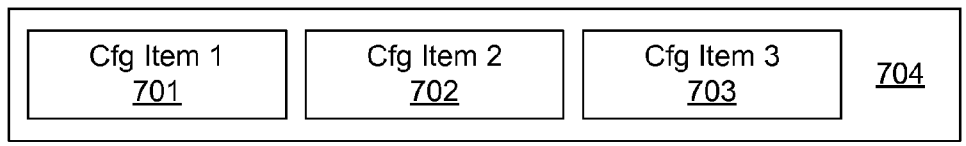
FIG. 7 is a diagram of a movable layer for an interface component populated with data provided by a data object associated with the interface component.

The result, illustrated in FIG. 7, is a DIV layer 704 visually populated with interface components in the form of cells 701, 702, 703 (i.e., 701-703). DIV layer 704 can be implemented as DIV layer 504, such as by having cells 507-509, as shown in FIG. 5. Cells 701-703 are linked to DIV layer 704 through the custom attributes of DIV layer 704 being assigned to data object 602 (FIG. 6). Data object 602 (FIG. 6) contains data related to the visual presentation of cells 701-703, as well as object data related to the configuration and operation of cells 701-703 within DIV layer 704. Cells 701-703 may be used as elements of a rule indicated or defined by DIV layer 704 within table 502, for example. Cells 701-703 may therefore be used to configure the rule represented by the indicated row, such as indicated by DIV layer 504 of table 502. The rule provided in DIV layer 504 of table 502 is determined by cells 701-703 and the configuration data of cells 701-703, such as may be defined by data object 602.

Each data object assigned to a row of table 502, such as data object 602, may have different data. An inner-table generator code, such as may be implemented as a function, can be used for drawing the particular items such as cells 701-703 for table 502 for a given row. The object-oriented table construct used to form table 502 provides for descendants of moveable DIV layer 504. The data in each row of table 502 can be anything that may be visually represented to fit within the physical visual constraints of DIV layer 504.

Using the above-described constructs, rows can be easily moved, added, deleted or reformatted. The data for the visual elements, such as the data in data object 602 for cells 701-703, can be tied to a single source such as DIV layer 704. The information can thus be moved anywhere on a display.

Figure 8:
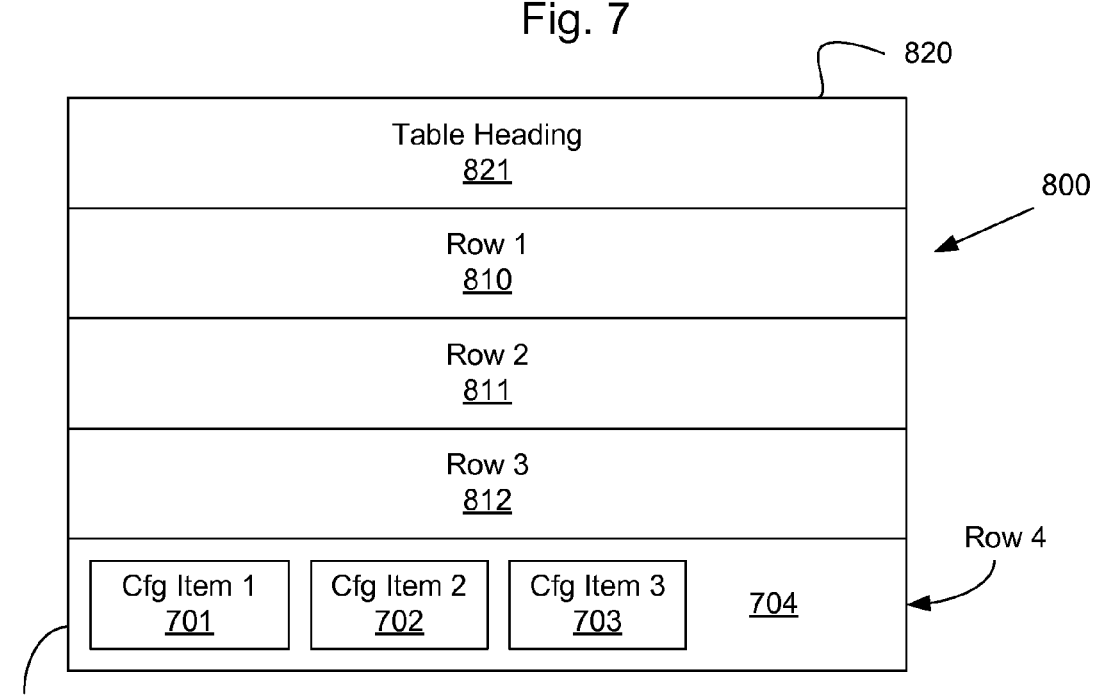
FIG. 8 is a diagram of a movable layer for an interface component with a visual location within the interface component.

Referring to FIG. 8, a table 800 is an HTML element that illustrates manipulation of visual elements in accordance with the present disclosure. Table 800 can be implemented as table 502 (FIG. 5), and can be implemented as visual element 314 in conjunction with HTML element 316 (FIG. 3), or table object 416 (FIG. 4). DIV layer 704 is illustrated as occupying a row element 813 that is arranged as a fourth row of a table template 820 that includes row elements 810, 811, 812 and 813 (i.e., 810-813) and a heading element 821. Row elements 810-813 can represent visual placeholders or locations in table template 820 for locating a rule represented by DIV layer 704. DIV layer 704 includes constituent elements that contribute to defining the rule, where the constituent elements can be visually provided in the form of cells 701-703, for example. In such an exemplary embodiment, moving DIV layer 704 to a different row of table template 820 changes the precedence or sequence in which the rules are evaluated. Because DIV layer 704 is configured to be a movable interface component with modifiable visual attributes, changes to the configuration of table 800 can easily be made by moving DIV layer 704 within the interface. When DIV layer 704 is moved in table 800, relationships between row elements of table template 820, DIV layer 704 and the data represented by cells 701-703 can all be modified in accordance with the visual movement.

Figure 9:
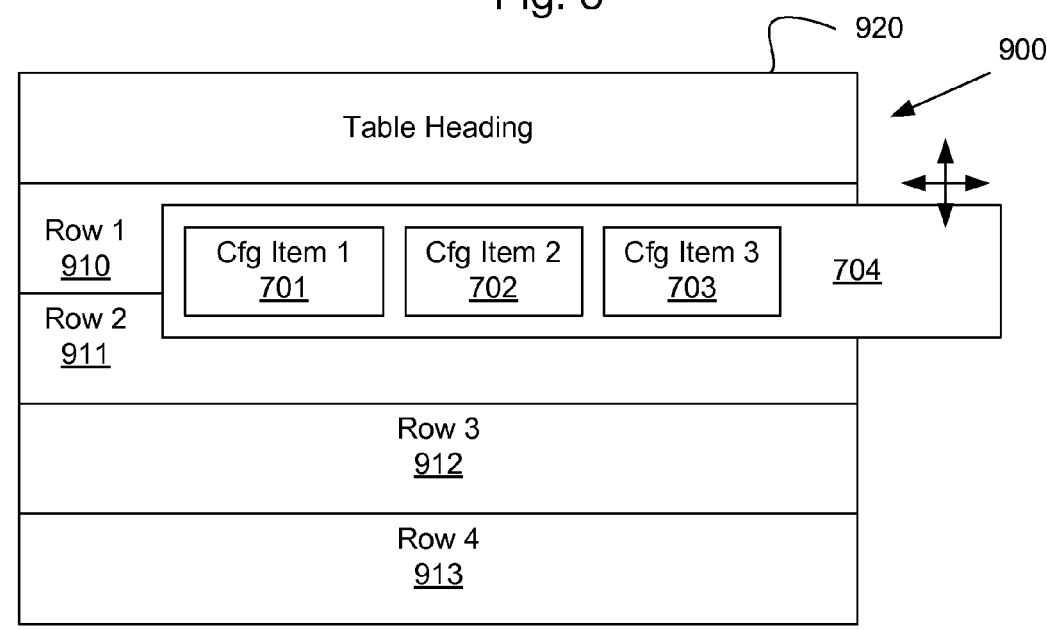
FIG. 9 is a diagram of a movable layer for an interface component being movable in location with respect to the interface component.

Referring now to FIG. 9, an illustration of a modification to table 800 (FIG. 8) is illustrated with table 900 that has row elements 910, 911, 912 and 913 (i.e., 910-913) within a table template 920. DIV layer 704 is shown as being moved within the UI to a different row of table 900. In FIG. 8, DIV layer 704 is illustrated as being located on top of row element 813 as a fourth row of table template 820, which indicates that DIV layer 704 is a child element of table template 820. In FIGS. 8 and 9, DIV layer 704 is configured so that selection of the interface component permits movement around the display. For example, script code is provided to extract DIV layer 704 from assignment to row element 913 of table template 920. Upon user selection, such as by a mouse click, DIV layer 704 can be dragged around the display using the mouse as an input device. Alternately, or in addition, DIV layer 704 can be selected and moved about the display using other input devices such as keystrokes from a keyboard. The script code that extracts DIV layer 704 from assignment to row element 913 of table template 920 provides a display to permit DIV layer 704 to appear to float on the display, as controlled by the user. FIG. 9 illustrates the concept of DIV layer 704 being relocatable through selection and user action.

Referring to FIG. 10, an illustration of a modification to table 800 (FIG. 8) is illustrated with a table 1000 that has row elements 1010, 1011, 1012 and 1013 (i.e., 1010-1013) within a table template 1020. DIV layer 704 is illustrated as being repositioned over row element 1011, representing a second row of table template 1020. The placement of DIV layer 704 over row element 1011 from row element 813 (FIG. 8) can cause script code to be activated to reassign DIV layer 704 to a new parent element. For example, row element 1011 represents a location within the parent element of table template 1020, as illustrated in FIG. 10. With respect to the view and interaction with a user, the movement of DIV layer 704 from row element 813 of table template 820 (FIG. 8) to row element 1012 of table template 1020 is a simple drag and drop operation that is highly intuitive in the user interface. The movement of DIV layer 704 represents a change in the underlying processing of table 1000, since the rule represented by DIV layer 704 is processed after a rule located over row element 1010, rather than after a rule located over row elements 1010, 1011 and 1012 of table template 1000.

DIV layers and associated data can generally occupy row elements 510-513 of table template 520 (FIG. 5), row elements 810-813 of table template 820 (FIG. 8), row elements 910-913 of table template 920 (FIG. 9) or row elements 1010-1013 of table template 1020 (FIG. 10). In one exemplary embodiment, the data may be shifted up or down a row as the user moves the selected DIV. In another exemplary embodiment, the data may be entirely replaced.

The UI hosting table 800 (FIG. 8), for example, may have a control (not shown), such as a button, that can be activated by the user to add a row. The user action of selecting such an "Add" button can activate script or code for dynamically creating a new row in table 800 and building the DIV and associated data provided by the user as part of the "Add" process. Deleting a row is achieved upon receipt of the appropriate user input, by activating a "Delete" button with the desired row selected, for example. Such a deletion action can result in deletion of the DIV as a child node as well as the custom attributes, which include the associated data object.

The table example described above with reference to FIGS. 5-10 solves the problem of reordering rules in a table by dragging and dropping what appears to be a row via the user interface. The concept of the disclosed system and method is not at all limited to table objects, however, and can be applied to object data of any type that can be assigned to an arbitrary element and moved around a page in a display. As an example, the visual features of such an element can vary greatly based on the data in the object assigned to the element. Some examples of arbitrary elements to which object data of any type can be assigned are text elements, graphic elements, icons, lists, spreadsheets, hyperlinks, buttons, and any other type of element that can be provided in a display.

The concept of moving data with visual elements can be employed on multiple levels or hierarchies in an object-oriented model. For example, FIG. 11 shows two movable row elements 1104, 1106 that can be associated with a table template, such as any of table templates 520, 820, 920 or 1020 depicted in FIGS. 5 and 8-10. Row element 1104 includes four interface components arranged as cells 1110, 1111, 1112 and 1113 (i.e., 1110-1113) labeled "Config A", "Config B", "Config C" and "Config D". Row element 1106 includes a single interface component arranged as cell 1114 "Config E". Each of cells 1110-1113 are themselves visual elements with an assigned data object as discussed above. Just as row elements 1104, 1106 can be moved around, added, deleted and modified within a table as described earlier, the individual or constituent cells 1110-1114 can be moved around, added, deleted or modified. In addition, multiple rows can be moved simultaneously, or one or more columns of a table may also be relocated to change their operation. Other visual elements can similarly be manipulated in groups or individually, such as elements of a list, portions of a spreadsheet or elements of a hierarchy such as a directory structure, which are provided in a web browser display. In general, any type of visual element or element that need not be visual but can be manipulated through user input may be used in accordance with the present disclosure.

Figure 13:
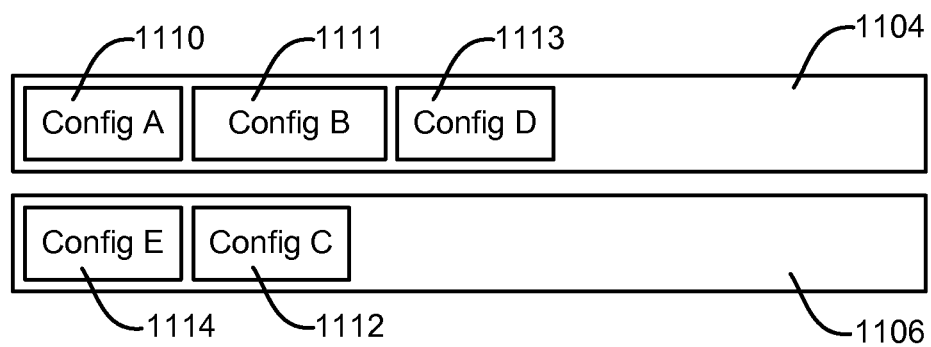
FIG. 13 is a diagram of a movable layer for an interface component with a constituent element being moved to another movable layer.

Referring to FIGS. 12 and 13, cell 1112 labeled "Config C" is illustrated as being moved from row element 1104 to row element 1106. Since the data for cell 1112 is assigned directly to the visual element, movement of cell 1112 also moves the data assignment to a new location. Cell 1112 can thus be moved around the display and assigned to any visual item or location. For example, and in keeping with the above discussion, a change in the assignment of a configuration item such as cell 1112 from a first row related to a first rule in an associated table to a second row related to a second rule in the table can be achieved with an intuitive drag and drop operation. In the examples illustrated in FIGS. 11, 12 and 13, a script can be provided to permit a user to visually move cell 1112 from row element 1104 to row element 1106. The script operates to reassign the object data associated with cell 1112 to row element 1106 as a child element of the associated table. In the process, the data associated with cell 1112 is moved to row element 1106. FIG. 13 illustrates the final result, in which the data associated with cell 1112 is now located in row element 1106.

Row elements 1104 and 1106 may also be relocated within an associated table as discussed above. The movement of individual items illustrated in FIGS. 11-13 adds another dimension to the visual configuration of the table in addition to the ability to move rows. The disclosed system and method also applies to the dynamic creation, manipulation and deletion of moveable items in the UI. The UI may be used to dynamically create an interface component, which can then be added in a desired location in the visual display.

Figure 14:
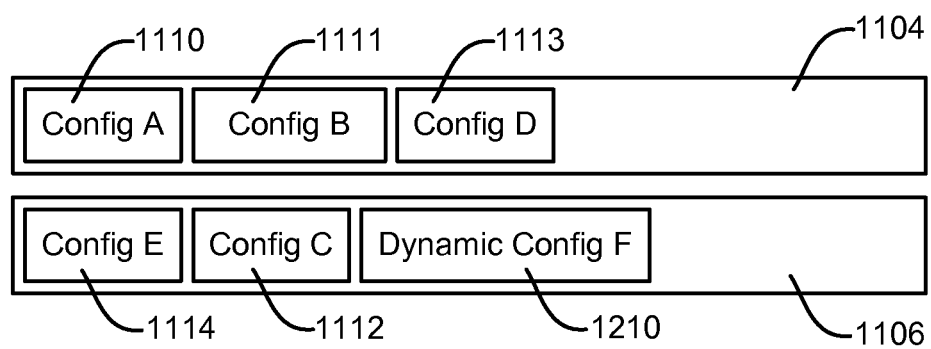
FIG. 14 is a diagram of a movable layer for an interface component having a dynamically created constituent element.

Referring to FIG. 14, a dialog box (not shown) can be provided in response to a user input to permit an interface component to be added. The dialog box may appear on the display, and the user can enter data to create a new cell 1210 labeled "Dynamic Config F". After the dialog completes, a script creates cell 1210, which appears as a moveable box within the visual display. The user can then drag and drop cell 1210 as a movable box to any other visual item that can accept cell 1210. Movement of cell 1210 to another interface component also moves the assignment of the object data associated with cell 1210. The result may appear as shown in FIG. 14.

The disclosed system and method provides UI interface components that are object-oriented and conceptually contain the data used to represent visual elements of the interface components. The custom attributes of the interface components are used to established associations between the interface component and data. When an item such as an interface component is moved, the data associated with the item is moved with it conceptually. The data can be configured and arranged at multiple hierarchical levels, as illustrated with the table examples discussed above. For example, the table is at one hierarchical level, rows and/or columns may be at another hierarchical level, and cells of the table may be at a further hierarchical level. Any number of hierarchical levels may be provided for an interface component or a group of interface components. The disclosed system and method can be used on any type of HTML element, for example, and may be used in any type of web browser environment.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A method for dynamic configuration of a component in a user interface that is implemented on a computer that includes a display and a storage memory, the method comprising:

storing a parent object instance in the storage memory, the parent object instance including a hierarchy;

storing a child object instance of the parent object instance in the storage memory, the child object instance including:

(i) display information for displaying a repositionable visual element in the display that is representative of the child object instance positioned in relation to a visual representation of the hierarchy of the parent object instance;

(ii) at least one visual attribute indicating at least an order of the child object instance in the hierarchy of the parent object instance; and (iii) a custom attribute linking the child object instance to data stored at a specified location in the storage memory, the data stored at the specified location indicating one or more operational properties associated with the child object instance in the order of the hierarchy of the parent object instance;

displaying, in accordance with the display information and the at least one visual attribute, the repositionable visual element in the display in relation to the visual representation of the hierarchy of the parent object instance;

receiving an input to manipulate a position of the visual element in the display;

modifying the display information of the child object instance in accordance with the manipulation of the position of the visual element; and modifying, in accordance with the data linked to the child object instance by the custom attribute, the at least one visual attribute to update the one or more operational properties of the child object instance, thereby changing how the child object instance operates when the manipulation of the position of the visual element in the display changes the order of the child object instance in the hierarchy of the parent object instance.

2. The method according to claim 1, further comprising:
providing one or more of the parent object instance or the child object instance as an HTML object element.

3. The method according to claim 2, further comprising:
displaying the visual element via a web browser.

4. The method according to claim 3, further comprising:
providing one or more of the parent object instance or the child object instance in accordance with a document object model via the web browser.

5. The method according to claim 1, further comprising:
employing a script to permit the visual element to be responsive to the input.

6. The method according to claim 1, further comprising:
using a timer to provide the input.

7. The method according to claim 4, further comprising:
using an asynchronous update to the document object model to provide the input.

8. The method according to claim 1, further comprising:
instantiating the child object instance to include a rule that is evaluated in an evaluation order in accordance with the hierarchy.

9. The method according to claim 1, further comprising:
employing a DIV layer to provide one or more of the parent or the child object instance.

10. The method according to claim 1, further comprising:
configuring the parent object instance as a table, such that the child object instance represents a member of the table.

11. The method according to claim 8, further comprising:
obtaining data indicating at least one rule from a product or process that is remote from the computer.

12. The method according to claim 1, further comprising:
displaying one or more controls in the display to indicate one or more operations of add, delete or modify the child object instance.

13. The method according to claim 1, further comprising:
instantiating the child object instance to permit the parent object instance to access the data indicating the one or more operational properties of the child object instance.

14. A system to permit dynamic configuration of a component in a user interface, comprising:

a client device for implementing a web browser using a storage memory, a processor, a display, and a network connection; and a parent object instance and a child object instance of the parent object instance in the storage memory, the parent and child object instances each representing a visual element that can be provided to the displays, wherein at least the child object instance includes:
(i) display information for displaying a repositionable visual element in the display that is representative of the child object instance positioned in relation to a visual representation of a hierarchy of the parent object instance;

(ii) at least one visual attribute indicating at least an order of the child object instance in the hierarchy of the parent object instance; and (iii) a custom attribute linking the child object instance to data stored at a specified location in the storage memory, the data stored at the specified location indicating one or more operational properties associated with the child object instance in the order of the hierarchy of the parent object instance;

wherein at least the child object instance is responsive to an input to provide a visual modification to the visual element, the visual modification being indicated in the child object instance; and wherein at least the child object instance is responsive to the input to modify the display information, and to modify, in accordance with the data linked to the child object instance by the custom attribute, the at least one visual attribute to update the one or more operational properties of the child object instance, thereby changing how the child object instance operates in response to the visual modification to the visual element in the hierarchy of the parent object instance.

15. The system according to claim 14, wherein one or more of the parent or the child object instance is configured as an HTML object element.

16. The system according to claim 15, further comprising:
a document object model implemented in the web browser.

17. The system according to claim 14, further comprising:
a script responsive to the input to modify the visual element.

18. The system according to claim 14, further comprising:
a rule in the child object instance that is evaluated in an evaluation order in accordance with the hierarchy.

19. The system according to claim 14, wherein one or more of the parent or the child object instance further comprises a DIV layer.

20. The system according to claim 14, wherein the parent object instance further comprises a table, and wherein the child object instance is representative of a member of the table.

21. The system according to claim 14, further comprising:
one or more user interface controls provided on the display and being responsive to input so as to permit implementation of one or more of an add, a delete or a modification operation.

22. A system to permit dynamic configuration of a component in a user interface, comprising:

a client device for implementing a web browser using a storage memory, a processor, a display, and a network connection; and a parent object instance and a child object instance of the parent object instance in the storage memory, the parent and child object instances each representing a visual element that can be provided to the display, wherein at least the child object instance is implemented as an HTML object element, the HTML object element including:
- (i) display information for displaying a repositionable visual element in the display that is representative of the HTML object element positioned in relation to a visual representation of a hierarchy of the parent object instance;
- (ii) at least one visual data attribute indicating at least an order of the HTML object element in the hierarchy of the parent object instance; and
- (iii) a custom data attribute linking the HTML object element to a data construct stored at a specified location in the storage memory, the data construct stored at the specified location indicating one or more operational properties associated with the HTML object element, and wherein at least the HTML object element is responsive to an input to provide a visual modification to the visual element, to modify the display information, and to modify, in accordance with the data linked to the HTML object element by the custom attribute, the at least one visual data attribute to update the one or more operational properties of the HTML object element, thereby changing how the HTML object element operates in response to the visual modification to the visual element.

\* \* \* \* \*